United States Patent [19]
Fehr et al.

[11] 3,890,515
[45] June 17, 1975

[54] MAGNETIC COUPLER FOR COUPLING ROTARY SHAFTS

[75] Inventors: Henri Fehr, Montmorency; José Mallen-Herrero, Paris, both of France

[73] Assignee: Compagnie de Construction Mechanique Sulzer, Paris, France

[22] Filed: Nov. 29, 1973

[21] Appl. No.: 420,060

[30] Foreign Application Priority Data
Nov. 30, 1972 Switzerland............... 17472/72

[52] U.S. Cl. ............................ 310/104; 310/105
[51] Int. Cl. ........................................ H02k 49/04
[58] Field of Search ....... 310/92, 93, 103, 104, 105, 310/106, 85, 86

[56] References Cited
UNITED STATES PATENTS

| | | | |
|---|---|---|---|
| 1,171,351 | 2/1916 | Neuland | 310/103 |
| 1,308,435 | 7/1919 | Maire | 310/104 |
| 1,696,132 | 12/1928 | Wermeille | 310/104 |
| 2,939,023 | 5/1960 | Fefr | 310/105 |
| 3,301,091 | 1/1967 | Reese | 310/103 X |
| 3,378,710 | 4/1968 | Martin, Jr. | 310/104 |

Primary Examiner—Donovan F. Duggan
Attorney, Agent, or Firm—Kenyon & Kenyon Reilly Carr & Chapin

[57] ABSTRACT

The coupler is provided with a pressure-tight partition in the space between the two shafts which effectively seals the two shafts from each other. The partition includes magnetizable elements located between the poles of the shaft rotors. These magnetizable elements are electrically connected together and grounded at one end while the other ends are separated by an insulating layer to prevent looping.

10 Claims, 5 Drawing Figures

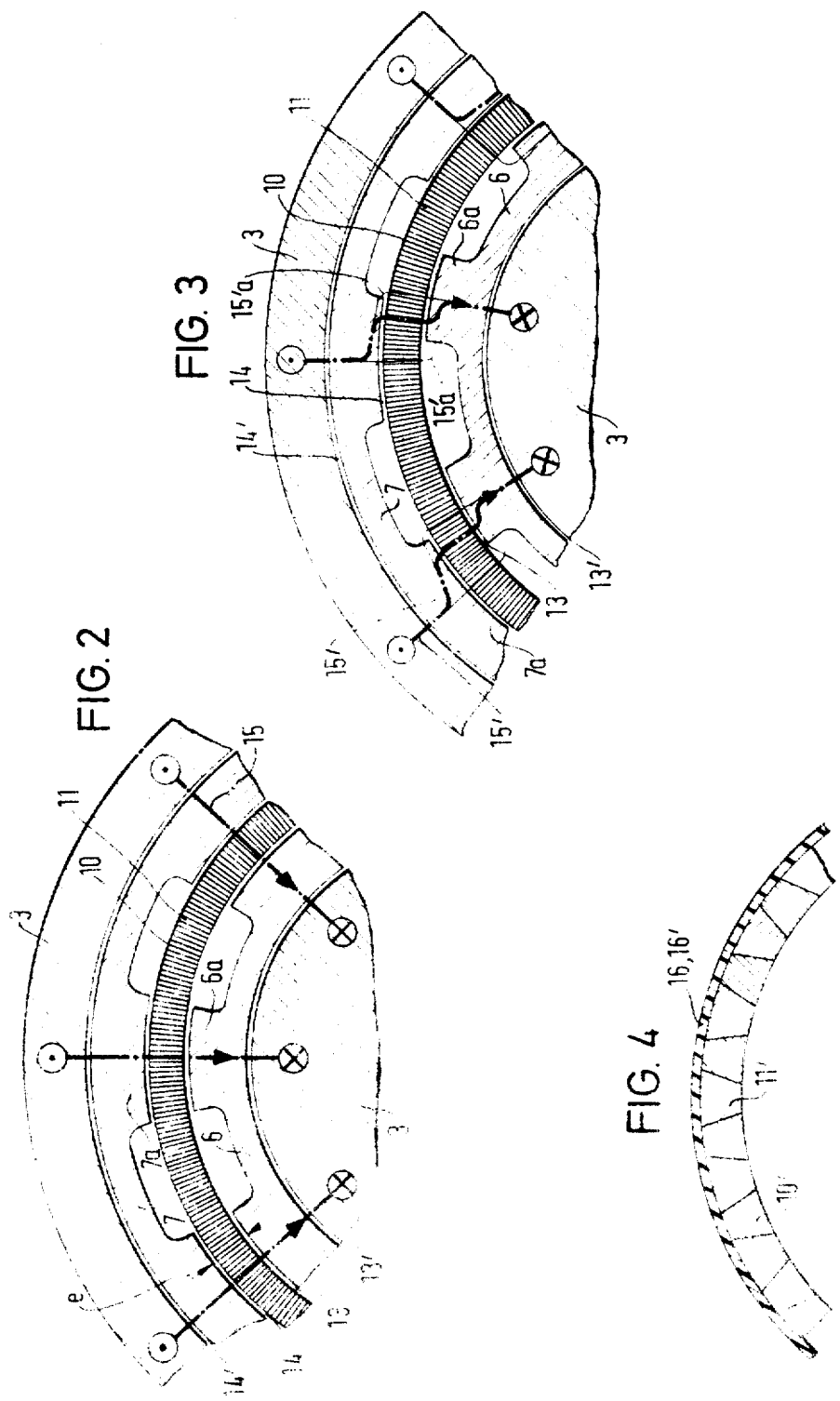

MAGNETIC COUPLER FOR COUPLING ROTARY SHAFTS

This invention relates to a coupler for coupling rotary shafts and particularly to a magnetic coupler which seals the shafts from each other.

Although a great number of magnetic couplers of greatly differing types are known, for example, for the transmission of a rotary or translatory motion, the imposition of a partition between a driving and a driven part creates substantial difficulties. Such a partition must not only have mechanical strength but also must have great magnetic permeability in the traverse direction, that is, in the direction in which the magnetic flux passes through. At the same time, this permeability must be substantially decreased parallel to the partition surface, that is, in the direction of the relative movement between the elements coupled together, by magnetic forces through the partition.

If electrically conductive metal partitions are used, then substantial energy losses are produced, particularly in the case of massive structures. In addition, there is a consequent heating up because of Foucault currents which would be induced by the change of intensity or of direction of the magnetic flux passing through the partition. These disturbing currents destroy a substantial part of the energy transmitted through the rotating field. As is known, the transmission of energy is based on the fact that the magnetic flux passing through the air-gap between the driving and the driven parts of the coupler is altered in a certain way. A massive partition, even if not magnetizable but only electrically conductive, therefore forms a shield that greatly impairs the efficiency of such a coupler.

If use is made of a pressure-tight partition of insulating material, e.g. synthetic resin, it is difficult to obtain satisfactory mechanical strength and to retain shape without unallowably increasing the thickness of the partition. This, however, increases the thickness of the air-gap to be traversed by the magnetic flux between the poles of the driving and of the driven parts. Because the magnetic forces between two poles behave inversely proportionally to the square of the width of the air-gap, a thick insulating non-magnetizable partition therefore limits the amount of energy that can be transmitted.

Finally, if use is made of a magnetizable partition in the air-gap, this would effectively shield the magnetic flux, at least when its permeability is high between the driving and driven parts, or in the direction of two close-together but dissimilar poles of one or the other part of the coupler.

Generally, it is desirable to make the magnetic permeability of a partition large in the direction of the operative flux, that is, transversely of the partition, so as to keep the magnetic resistance to be overcome by the flux as low as possible, that is, to keep the total distance travelled by the flux in passing through the air-gap between the stationary parts and the mobile poles of the coupler at a minimum. On the other hand, the permeability in the direction of the relative motion between the mobile parts, that is, in the case of a coupler transmitting rotary motion in the circumferential direction, must be kept as low as possible. Moreover, the magnetic pathes passing through the partition, have to be shaped, according to known techniques, in such a way that the Foucault current and the magnetic hysteresis losses are reduced to their minimum value.

In the case of a magnetic coupler for transmitting translatory motion through a pressure-tight partition, it has been proposed to use two substantially cylindrical coaxial driving and driven pole-pieces which are pushed into each other with each having a number of annular salient poles directed towards the corresponding counter-pole of the other pole-piece. In each case, an air gap is to be located between the pole and counter-pole. The two pole-pieces are made so as to be moved in an axial direction. Also, the driving pole-piece has a means to produce a magnetic flux for passing radially through the air-gap to couple the two pole-pieces together. In this way, the driven pole-piece would follow all motions of the driving pole-piece. In addition, a cylindrical partition is disposed in the air gap to extend coaxially of the two pole-pieces and form a pressure-tight container enclosing the inner pole-piece. This partition consists of superposed annular elements made of magnetizable sheet-metal material, but separated, however, from one another by insulating non-magnetizable inserts of similar form. For this purpose, use is preferably made of rings of transformer sheet-metal and paper, which may be pressed axially against one another by means of axial through-bolts or tierods and/or by means of adhesive. For reliable sealing, the partition is coated with a thin pressure-tight covering.

The partition is thus of lamellar structure. In the radial direction, that is, in the direction of the magnetic flux passing through the air-gap between a driving pole and the corresponding driven pole, the partition has great permeability. However, because of the non-magnetizable inserts, the permeability is considerably diminished in the axial direction; that is, in the direction of the relative motion between the two movable pole-pieces.

While such a coupler has a very satisfactory efficiency and good mechanical strength, the coupler permits only the transmission of a rectilinear alternating movement limited to a certain travel. A coupling in the rotary direction is impossible, because the mobile pole-pieces are made annular and run parallel to the magnetizable rings of the partition. The rings of the partition therefore present no resistance in the circumferential direction to the passing-through components of the magnetic flux so that no torque can be transmitted between the rotors of the coupler. Moreover, under certain circumstances, the magnetizable rings, being insulated from one another, receive an electrostatic charge that could impair the functioning of the coupler. Other problems arise from the fact that the driving component, carrying the means for producing the exciting flux, is made movable. As a result, the current supplying the exciting winding must either be brought in by flexible wires or by sliders, or else, where permanent magnets are used, the transmissable power remains limited. Thus, the known principle can ordinarily not be applied to the construction of a coupler for transmitting a rotary motion over a great power range.

Accordingly, it is an object of the invention to provide a partition between two magnetically coupled shafts which effects a high magnetic permeability in a transverse direction while effecting a low permeability in a circumferential direction of the shafts.

It is another object of the invention to substantially reduce any Foucault currents in the magnetic path through a partition of a magnetic coupler.

It is another object of the invention to provide a coupler with a satisfactory efficiency and mechanical strength.

It is another object of the invention to provide a magnetic coupler for transmitting a torque through a pressure-tight stationary partition.

It is another object of the invention to permit the transmission of high power with an efficiency comparable to that of known electromotors.

It is another object of the invention to provide a magnetic coupler which can be used for both synchronous and asynchronous operation.

Briefly, the invention provides a coupler for a pair of coaxial rotary shafts which comprises a pair of coaxial rotors mounted in spaced apart relation to define an air gap and a stationary rigid gas-tight liquid-tight partition in the air gap. The rotors each carry suitable pole rings disposed in facing relation while the partition includes a plurality of magnetizable structural elements arranged in a lattice-like manner and embedded in a non-magnetizable highly-resistive material. Each element forms a magnetic path in the direction of the passage of a magnetic flux therethrough which magnetic flux is generated by a suitable means within a housing of the coupler.

This magnetic coupler can be used to magnetically couple two rotary shafts for synchronous or asynchronous operation and can be used with similarly-directed or alternately-directed poles, and with an electromagnetic or permanent-magnet exciting field.

A magnetic coupler of this kind permits the transmission of rotary motion through a pressure-tight partition without any movable mechanical element having to pass through the partition. The magnetizable lattice-like armature formed by the structural elements of the pressure-tight partition allow the dimensions of the air gap between the pole rings of the two rotors to be kept small in spite of the thickness of the partition. This armoring, moreover, increases the mechanical strength of the partition.

This coupling is particularly advantageous for operating a machine that is located in a container which is pressure-tight and holds, for example, a decomposing or poisonous medium. The medium might also be under high pressure or great heat, as is the case, for example, with a circulating pump or a mixer of a chemical or atomic reactor, or where an apparatus has to be shielded from the influences of the external environment.

In order to transmit a torque through the partition from a driving shaft on one side to a driven shaft on the other side, the magnetizable elements are made as elongated rods or lamella, which extend parallel to the generation lines of the surfaces of the rotors adjacent to the air-gap and flowed through transversely by the magnetic flux. The magnetizable elements are connected together at one end in an electrically-conductive manner with one another and grounded in order to avoid any static charging while their other ends are separated from one another by an insulating layer to prevent any looping.

In one embodiment, the gas-tight and liquid-tight partition has a metallic non-magnetizable middle part to which the magnetizable elements are each welded or hard-soldered at one end. In this case, a non-magnetizable clamping ring is mounted in the housing to secure the partition to the housing while an insulating sealing ring is positioned between the partition and the clamping ring. Obviously, the magnetizable elements could also be fastened by the clamping ring to the coupling housing at one end, welded together or welded to the clamping ring and grounded, and insulated at the side of the metal middle-piece of the partition.

In principle, the air-gap of the rotor and the part of the pressure-tight partition situated therein may have the form of any desired body of rotation coaxial with the coupler axis. Preferably, however, a substantially cylindrical cup-shaped form is chosen with which, in a most simple way, the radial and/or axial forces, which act on one or both rotors of the coupler, become equalized. If, as is the case with another form of construction, the partition and rotors are made disk-like, for example, in order to shorten the coupler in the axial direction, then an axial bearing is provided to take the axial tensile forces between the cooperating poles of the two rotors. Here too, the resultant axial forces are normally small. Similarly, with all intermediate forms, axial bearings are provided where an axial force-component occurs between the rotors.

In order to increase the mechanical strength, the pressure-tight partition may be reinforced by a thin non-magnetizable non contuctible, layer of fibers similar to a glass woven fabric, or by a layer of boron-carbide fibers or the like, which when necessary may be impregnated with a suitable hardenable lacquer or synthetic substance. The partition may also, at least at one side, be sealed by a gas-tight and liquid-tight non-magnetizable layer.

These and other objects and advantages of the invention will become more apparent from the following detailed description and appended claims taken in conjunction with the accompanying drawings in which:

FIG. 2 illustrates a partial sectional view taken on line II—II of FIG. 1, that is, perpendicular to the axis of rotation of the coupler;

FIG. 3 illustrates a partial sectional view analogous to FIG. 2 wherein the rotors assume a position in which the associated poles are offset from one another;

FIG. 4 illustrates a partial sectional view through another form of construction of the partition wherein the magnetizable elements consist of small trapezoidal section rods;

In the various figures, like reference characters indicate like parts, supplemented when necessary by an index to distinguish between various forms of construction.

Figure 1:
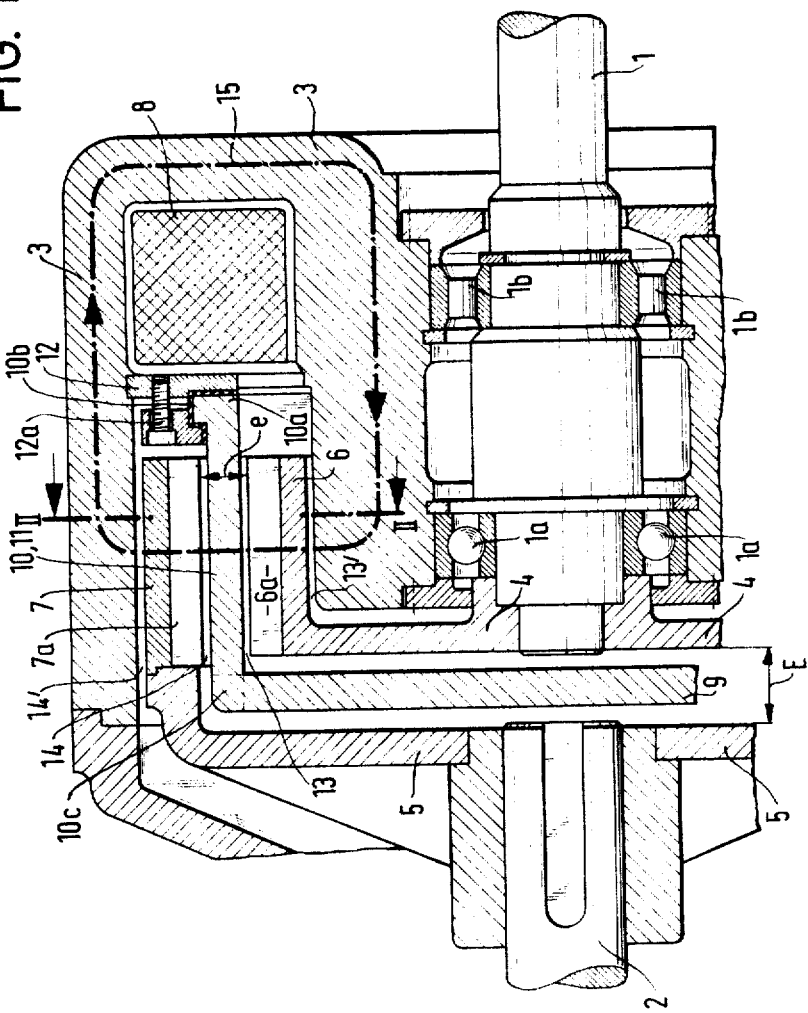
FIG. 1 illustrates an axial section through one half of a coupler constructed according to the invention for transmitting torque.

Referring to FIG. 1, the machine includes two coaxial shafts 1, 2 one of which acts as a driving shaft while the other acts as a driven shaft in known manner. One shaft 1 is mounted via a ball bearing 1a and a roller bearing 1b in a housing 3 of a coupler. The shafts 1, 2 carry two disk-like flanges 4, 5 which are spaced apart by an air gap E and are advantageously made of non-magnetizable material. The flange 4 on the shaft is of smaller diameter than the flange 5 and each carries a rotor 6, 7 at their circumferential periphery. These rotors 6, 7 are coaxial with the shafts 1, 2 as well as with one another and carry the poles 6a, 7a in spaced apart relation in the form of pole rings to define an air-gap of radial width e. A means for generating an exciting field, such as a stator- or excitation-winding 8, is mounted in the coupler 3 to produce a magnetic flux which passes through the rotors 6, 7.

The structure of the rotors 6, 7 as well as that of the excitation winding 8 is of known construction depending on the type and the application of the coupler concerned. Thus, this coupler 3 can be made for synchronous operation or for asynchronous operation, and may have similarly directed or oppositely directed poles. Because the present invention, and also the excitation winding 8, are not associated with certain forms of construction of the rotors 6, 7, their details do not need to be described in detail.

A pressure-tight partition 9, 10, 11 divides the air-gaps E, e situated between the flanges 4, 5 and rotors 6, 7. In the construction shown, the partition 9, 10, 11 is cup-shaped with a bottom consisting of a circular metallic and non-magnetizable disk 9, for example, of stainless steel, whose diameter is somewhat smaller than the inner diameter of the pole 7a of the outer rotor 7 and whose thickness is substantially smaller than the distance E between the flanges 4, 5. The disk 9 is grounded in a known way; that is, depending on the applicable specifications, either to the machine housing or to the zero conductor of the supply network (not shown). The circular disk 9 has uniformly spaced radial slits or grooves at the circumferential periphery into which are conducted and welded, or hard-soldered, the left-hand ends 10c of thin high-permeability magnetizable-material sheet-shaped elements 10. These elements 10 may be in the form of lamella or rods forming as a whole a kind of cage or cylindrical lattice, which is disposed in the air-gap e existing between the rotors 6, 7. The other ends (at the right-hand in FIG. 1) of the elements 10 form an offset 10a and the spaces between the elements 10 are filled with a non-magnetizable insulating material 11 preferably a synthetic resin in pressure-tight manner to embed the elements 10. The offsets 10a form an outer flange, which is disposed within a non-magnetizable clamping ring 12 in the housing 3 with an insulating sealing ring 10b between the offsets 10a and clamping ring 12 in order to fasten the partition to the inner wall of the coupler housing 3 in gastight and liquid-tight fashion. As shown, screws 12a are used to clamp the two sections of the clamping ring 12 together about the offsets 10a. This arrangement also prevents the formation of electrically-conductive loops between the elements 10.

The path 15 of the magnetic flux, induced by the excitation current in the stator winding 8, passes on the one hand through the air-gaps 13' and 13 between the housing 3 which acts as a stator and rotor 6, and on the other hand between the poles 6a and the magnetizable elements 10 of the pressure-tight partition. The flux passes similarly in the air-gaps 14, 14' between the elements 10 of the partition and the poles 7a of the outer rotor 7, and from this back to the stator 3.

As shown by FIGS. 2 and 3, the efficiency of the arrangement in which the magnetic flux 15 is conducted through the magnetizable elements 10 of the pressure-tight partition may be explained as follows: so long as the poles 6a and 7a of the two rotors 6 and 7 are opposite, as shown in FIG. 2, they are, looking in the flux direction, at a spacing e determined essentially by the thickness of the pressure-tight partition 10, 11, and by the air-gap 13, 13' and 14, 14'. The air-gaps prevent any contact or any friction between the rotors 6, 6', and the fixed parts of the coupler, e.g. the stator 3 and the pressure-tight partition 10, 11. While an air-gap of the width e would offer great resistance to the passage of magnetic flux, the flux is, however, inversely proportional to the total resistance of the air-gap passed through during a loop. By inserting the magnetizable elements 10 into the pressure-tight partition, an equal number of magnetic paths are formed which pass through the partition. At the same time, the air-gap is reduced to the sum of the remaining air-gaps 13, 13', 14, 14'; that is, to a fraction of the original value e. As a result, the magnetic flux again increases inversely proportionally to the ratio of the corresponding magnetic resistances.

As indicated, each pole ring has an equal number of protruding poles 6a, 7a as the other and the poles 6a, 7a are equally distributed over the whole circumference of the respective ring and mate with the poles of the other rotor.

If, as shown by FIG. 3, a certain relative twist or offset is assumed between the rotors 6, 7, that is, if the associated poles 6a, 7a are set at an angle relative to one another, then there is an increase of the magnetic resistance of the air-gap situated between the poles. The resulting alteration of the flux then determines the forces occuring between cooperating poles, that is, the alteration also determines the maximum torque the coupler is capable of transmitting. As can be seen from FIG. 3, the magnetic elements 10 guide the flux 15' during passage through the partition 9, 10 in a precisely radial direction, because the permeability of the partition is definitely much smaller in the circumferential direction than in a radial direction because of the non-magnetizable insulating layers 11 disposed between the magnetizable elements 10. A part of the flux lines 15' is therefore deviated toward 15a in the intermediate space or air-gap situated between each two successive poles 6a and 7a of one and the same rotor. Therefore, for the geometry under consideration, the relative changes of the magnetic resistance ascribable to the remaining air-gap become considerably amplified when the poles 6a and 7a become twisted out of the extreme position in which they are opposite into the other extreme position in which they are situated in the middle of the intermediate space between two opposite poles. The arrangement thus improves the transmittable power and efficiency of the coupler considerably.

In order to ensure the efficiency of the arrangement, it is necessary that the magnetizable elements of the partition, that is, the lamella 10 or small rods 10' (FIG. 4), and the poles 6a and 7a of the rotors 6 and 7 have parallel edges in the axial direction, which run perpendicularly of the direction of relative movement between the rotors 6, 7. On the other hand, the exact form of the cross-section of the elements 10, 10', plays only a secondary part in guiding the magnetic flux. It is therefore advantageous to form the elements 10, 10' for mechanical strength and for stiffening of the partition. For example, as shown by FIG. 4, the elements 10 are made with a trapezoidal or rectangular cross-section instead of the radially-set lamella of the type shown in FIGS. 1, 2 and 3. In order to strengthen the partition 9, 10, a thin layer 16 of fibers or fabric, e.g. glass fabric, boron-carbide fibers, or some other analogous non-magnetizable material, which may on occasion be impregnated, is applied to one side of the partition 9, 10. The partition may also be sealed by a supplementary layer 16'.

A magnetic coupler for transmitting a rotary motion which is provided with a cylindrical air-gap has an advantage in that the magnetic pulling forces, which act radially between the rotors and the fixed parts (stator and partition strengthened with magnetizable elements 10, 10'), counterbalance one another and compensate. Thus, no components can be formed in an axial direction. The bearings 1a, 1b, therefore present no problems.

Figure 5:
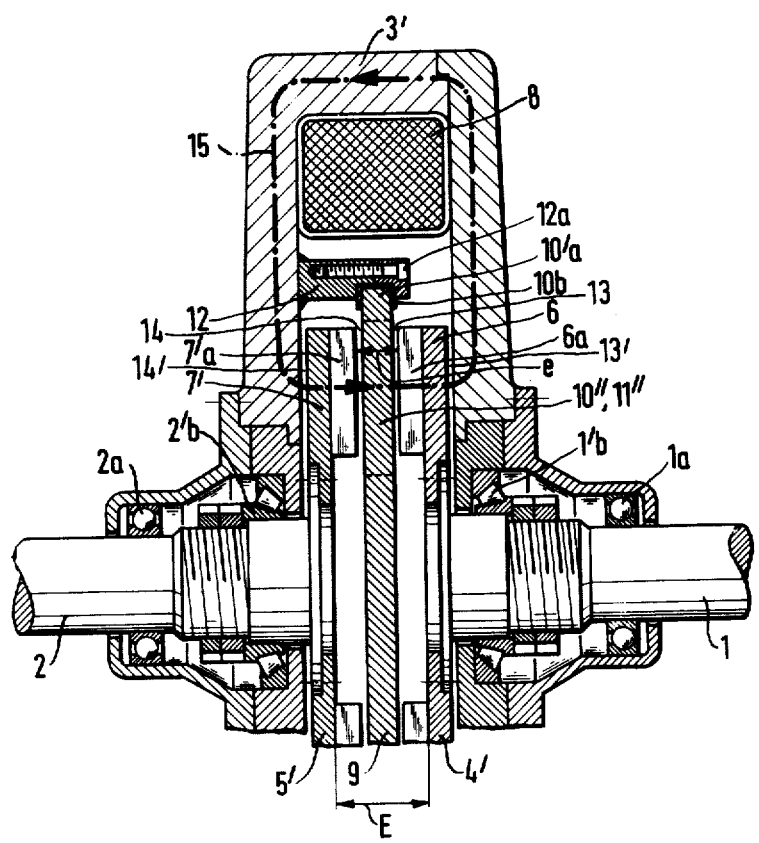
FIG. 5 illustrates an axial sectional view through one half of a coupler made analogously to FIG. 1 but with disk-like rotors so that their poles and the magnetizable elements of the pressure-tight partition are in the radial direction disposed in planes perpendicular to the axis of rotation.

The relationships are somewhat different when for example, in order to reduce the overall length of the coupler the construction of FIG. 5 is chosen. In this case, the flanges 4', 5' and the rotors 6', 7' carrying the poles, as well as the partition 9, 10'', 11'', are made as disks or slices and are disposed in planes set perpendicularly to the longitudinal axis of the coupler. Here too, the greater part of the axial force between the rotors 1, 2 is balanced by the attraction between housing and rotor. Nevertheless, a thrust-bearing 1'b is provided to take axial forces if need be. With this construction, the elements 10'' extend radially into a plane perpendicular to the axis. The elements 10'' are welded or hard-soldered at one end to the circumference of the middle metallic and non-magnetizable disk 9 of the partition, and the other ends are insulated and fastened in gas-tight and liquid-tight manner to the inner wall of the coupler housing, through the intermediary of an insulating sealing-ring 10b, and by the aid of the clamping ring 12 and screws 12a.

The form of construction of the electromagnetic coupler of the invention may undergo many modifications from the described examples. Many of these are obvious to a specialist, provided that the principle of the invention has once been recognized.

What is claimed is:

1. A coupler for a pair of coaxial rotary shafts comprising
    a housing having means for generating an exciting field therein to produce magnetic flux;
    a pair of coaxial rotors mounted in spaced apart relation to define an air gap therebetween, each rotor being disposed for mounting on a respective shaft;
    a pair of pole rings, each said pole ring being mounted on a respective rotor and located in said air gap in facing relation to each other; and
    a stationary rigid gas-tight and liquid-tight partition disposed in said air gap between said pole rings to seal said rotors from each other, said partition including a plurality of magnetizable thin elongated elements extending parallel to and between said opposite poles and embedded in a non-magnetizable highly resistive material in a lattice-like manner, each element forming a magnetic path in the direction of the passage of the magnetic flux through said partition, said elements being electrically connected and grounded at one end, and an insulating layer separating each element from the adjacent elements from said connection through to the opposite end thereof to prevent looping.

2. A coupler as set forth in claim 1 wherein said partition includes a metallic non-magnetizable disk secured to said one end of each element.

3. A coupler as set forth in claim 1 which further comprises a non-magnetizable clamping ring mounted in said housing to secure said partition to said housing and an insulating sealing ring between said partition and said clamping ring.

4. A coupler as set forth in claim 1 wherein said partition is of cylindrical shape.

5. A coupler as set forth in claim 1 wherein said partition includes a thin non-magnetizable reinforcing layer of fibers thereon.

6. A coupler as set forth in claim 1 wherein said partition has a non-magnetizable gas-tight liquid-tight sealing layer at least on one side.

7. A coupler as set forth in claim 1 wherein said rotors are disposed in concentric relation and said elements are disposed in an annular array.

8. A coupler as set forth in claim 7 wherein said partition includes a disk secured to said elements to define a cup-shaped partition.

9. In combination;
    a housing;
    a pair of coaxial shafts rotatably mounted in said housing;
    means in said housing for generating an exciting field to produce a magnetic flux in an air gap coaxial to said shafts;
    a pair of rotors mounted on said shafts, each rotor having a pole ring thereon, each pole ring having an equal number of protruding poles as the other, said poles being equally distributed over the whole circumference of said respective ring and mating with said poles of the other rotor;
    a stationary partition mounted in said housing in sealed relation thereto, said partition being disposed in said air gap and including a plurality of magnetizable elongated sheet-shaped elements between and parallel to said poles to define thin radial magnetic paths through said partition for the magnetic flux, said elements being electrically connected and grounded at one end, and an insulating layer separating each element from an adjacent element from said connection through to the opposite end of said elements to prevent looping.

10. The combination as set forth in claim 9 which further includes a plurality of pole rings on each rotor, said pole rings being disposed in facing relation to the opposite rotor.

* * * * *